United States Patent Office 3,123,554
Patented Mar. 3, 1964

3,123,554
**METHOD OF DISINFECTING AND AUTOMATI-
CALLY MAINTAINING THE pH OF WATER IN A
SWIMMING POOL**
William Bruce Murray, 929 Terraine Ave.,
Long Beach 4, Calif.
No Drawing.   Filed Sept. 25, 1962, Ser. No. 226,167
5 Claims.   (Cl. 210—60)

The present invention relates generally to the treatment of water in swimming pools, and more particularly to a novel composition which, when added to pool water during circulation thereof, sterilizes and renders the water non-corrosive to the metallic and plastic parts of the pool.

In the modern, present-day swimming pool, a power-operated pump is normally provided, the suction side of which is connected to the lower portion of the pool, with the water being withdrawn from the pool by the pump to be discharged through a filter and then returned to the pool. Circulation of water in this manner is necessary to remove particles of both organic and inorganic materials, which if not removed, may tend to discolor the pool water and facilitate growth of bacteria therein. In addition to recirculating the water, it is necessary in the maintenance of a pool to control the pH value of the water therein to inhibit the growth of algae, which is undesirable in that algae discolors the pool walls. If algae is permitted to develop over a period of time, it will ultimately increase to the extent that flow of water through the pool filter is restricted or completely obstructed.

In addition to circulating pool water in the manner described, it is also necessary that the water be subjected to a sterilization agent, and the agent normally employed for this purpose is chlorine. However, the handling of liquid chlorine is hazardous, and the equipment for metering liquid chlorine into a pool is relatively expensive. Accordingly, liquid chlorine as a sterilization agent for pools is seldom used in residential installations, but is provided by adding an unstable compound to the pool water. Such a compound contains both minerals and chlorine, and breaks down when exposed to the atmosphere and sunlight to liberate the chlorine and sterilize the pool water.

Although the addition of such unstable compounds to the water of a swimming pool to sterilize the same is convenient, such compounds as have been available for this purpose heretofore have been excessively alkaline in order to preserve and stabilize the chlorine ion therein. This excess alkalinity of previously available treating compounds, due primarily to the quanity of sodium hydroxide and calcium hydroxide contained therein, progressively raises the pH of the pool water until the water becomes so caustic that it must be adjusted with muriatic acid to provide the proper disinfecting action. Also, when the water in a pool rises to a pH above eight, the potency of the liberated chlorine for sterilization purposes is substantially reduced.

The addition of muriatic acid to pool water to reduce the pH thereof is a somewhat hazardous operation, and unless this acid is carefully used, the pH of the pool water may drop below 7.4. When the pH of pool water drops below 7.4, the possibility of extensive corrosion to metallic fittings in the recirculation system of the pool exists. In the event the pH of the pool water is lowered too much by the addition of muriatic acid, the plastered portions of the pool may be adversely affected.

A further objection to prior pool water treating compounds has been that if there are substantial shifts in the degree of alkalinity of the water in a pool due to the addition of muriatic acid, the water may become turbid through the precipitation of finely divided calcium carbonate.

A primary object of the present invention is to provide an inexpensive composition that is stable if maintained in a dry state which can be added to the pool water upstream from the filter in the circulating system in either a powder or tablet form, and when so added will react with the water to provide chlorine ions for the sterilization thereof.

Another object of the invention is to provide a composition that so reacts when in contact with pool water as to correct any out of balance in the chemicals therein and maintain the pool water at a pH between 7.4 and 7.8 to permit optimum sterilization of the pool water by liberated chlorine ions.

A further object of the invention is to provide a pool water treating composition that is relatively safe to handle, and one that eliminates the hazards of handling liquid bleaches and muriatic acid that must now be used in controlling the pH of a pool.

A still further object of the invention is to provide a pool water treating composition that is simple and easy to use, and completely eliminates the possibility that the user might make the water so alkaline that liberated chlorine has little or no sterilizing effect, or so acid that the metal and plaster parts of the pool are attacked by the pool water.

The basic ingredients of the present composition are calcium hypochlorite and sodium bicarbonate, which in the dry state are mixed together, and the resulting mixture in powder or tablet form added to the pool water as it circulates, with this addition preferably being made at a location ahead of the filter in the circulating system. The construction of the modern residential swimming pool is so well known that a drawing thereof is not believed necessary. Residential pools of today include a water circulating system having a power-driven pump, with the suction of the pump being connected to the lower portion of the pool by suitable piping. The discharge of the pump is connected to a filter that may be any one of a variety of types, with the water as it discharges from the filter being returned to the pool, preferably at a location in the upper portion thereof.

The calcium hypochlorite and sodium bicarbonate composition may be disposed in a porous basket or container, that is supported in the piping connection between the discharge of the pump and the inlet to the filter by any conventional means such as adding a T to the piping, with the T having a threaded plug which closes the open outlet thereof, and supports the basket in the flow of water as it discharges from the pump to the filter inlet.

The reaction that takes place when the present composition is caused to react with the discharged water as it flows from the pump to the inlet of the filter is disclosed in the following seven equations. The molecular proportions are tabulated immediately below each compound in each equation, and the theoretical reaction equivalents are contained in the brackets, also below each compound. Thus, if it is assumed that the latter values are in pounds, Equation 1 states that 1.18 pounds of sodium bicarbonate are necessary to react with 1.00 pound of calcium hypochlorite on a 100% basis. This reaction in a limited quantity of water results in an insoluble product, calcium carbonate; a soluble bleach, sodium hypochlorite; a gas, carbon dioxide, and finally water.

(1)

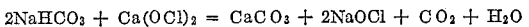

$$2NaHCO_3 + Ca(OCl)_2 = \underline{CaCO_3} + 2NaOCl + CO_2 + H_2O$$

168.030   142.994   100.090   148.908   44.010   18.016
(1.18)    (1.00)    (0.71)    (1.04)    (0.31)   (0.12)

The sodium hypochlorite is in solution according to Equation 2 in the form of hypochlorous acid and sodium hydroxide:

(2)  NaOCl + H₂O = HOCl + NaOH
     74.454   18.016   52.465   40.005
     (1.04)   (0.25)   (0.74)   (0.55)

All of the carbon dioxide of Equation 1 combines with an equivalent amount of sodium hydroxide and in so doing converts the caustic alkalinity to soluble sodium bicarbonate. Note that the theoretical quantity of sodium bicarbonate in Equation 1 necessary to complete the reaction can be reduced by the amount formed in Equation 3:

(3)  NaOH + CO₂ = NaHCO₃
     40.005   44.010   84.015
     (0.28)   (0.31)   (0.59)

The hypochlorous acid of Equation 2 decomposes upon its use as an oxidizing or bleaching agent:

(4)  HOCl = O + HCl
     52.475  16.000  36.465
     (0.74)  (0.22)  (0.52)

The remaining sodium hydroxide (0.55−0.28=0.27 pounds), is neutralized by a portion of the hydrochloric acid supplied by Equation 4:

(5)  HCl + NaOH = NaCl + H₂O
     36.465   40.005   58.454   18.016
     (0.25)   (0.27)   (0.40)   (0.12)

The remaining hydrochloric acid then converts the calcium carbonate of Equation 1 by the process of Equation 6 producing soluble calcium chloride, carbon dioxide gas and additional water:

(6)  2HCl + CaCO₃ = CaCl₂ + CO₂ + H₂O
     72.930   100.090   110.994   44.010   18.016
     (0.27)   (0.37)    (0.41)    (0.16)   (0.07)

Since all of the caustic alkalinity has been destroyed, the 0.34 pound of calcium carbonate left from Equation 6 is partially converted to the bicarbonate by the bicarbonate gas. Although it appears that all of the calcium carbonate has been utilized, only a small percentage is used in this reaction because of the insolubility of the calcium carbonate:

(7)  CaCO₃ + CO₂ + H₂O = Ca(HCO₃)₂
     100.090   44.010   18.016   162.116
     (0.37)    (0.16)   (0.01)   (0.54)

The presence of residual calcium carbonate in the pool water automatically buffers the water against any corrosive tendency it may have. For example, if the water in the pool is corrosive due to a low alkalinity, it will absorb the residual calcium carbonate until the water is at a point of saturation and is no longer corrosive. A water which is neither corrosive nor scale-forming, but is already at saturation, will neither accept nor reject residual calcium carbonate. Waters which have high concentrations of calcium carbonate coupled with a high pH actually precipitate calcium carbonate out of solution, down to a point of saturation.

In the use of the present composition it is the intent that the residual calcium carbonate, which from experience has been found to be extremely finely divided, be retained on the grid system of the pool filter, and the pool water under discharge from the pump be made to flow continuously through calcium carbonate deposited on the grid in order that the water may be subjected to the action thereof whereby the pH of the water is adjusted to between 7.4 and 7.8. If desired, a secondary filter could be located in the circulation system of the swimming pool ahead of the filter normally associated therewith so that the precipitated, finely divided calcium carbonate deposited in this secondary filter is at all times in contact with the water discharging through the secondary filter.

Calcium carbonate can be precipitated on the filter in the manner just described to control the pH of the pool water by the use of a composition which is a mixture of calcium hypochlorite and sodium carbonate in the proportions listed below in Equation 8.

(8)  Ca(OCl)₂ + Na₂CO₃ = CaCO₃ + 2NaOCl
     142.994    106.004    100.090   148.908
     (1.00)     (0.75)     (0.71)    (1.04)

This product dissociates into salt and oxygen as per Equations 2, 4 and 5 of column 3. The absence of carbon dioxide in this reaction does not convert the caustic alkalinity to bicarbonates as formerly, but the sodium hypochlorite in the concentrated solution is as sodium hydroxide, which of course, effects its efficiency as an oxidizing agent.

Tests have been carried out to confirm the performance of sodium bicarbonate and sodium carbonate in combination with calcium hypochlorite as described, and on August 10, 1962, a test was conducted in which the pH values of three concentrated compositions were analyzed. In this test, 1.43 grams of 70% calcium hypochlorite was added to each of three 150 ml. Pyrex glass beakers. To one of the samples, 0.75 gram of Na₂CO₃ were added, and to the other, 1.18 grams of NaHCO₃. After diluting the three samples with 110 ml. deionized water and taking an initial pH of the solutions, each of the three beakers was placed in direct sunlight to destroy the hypochlorous acid. As a result of the decay of the hypochlorous acid per unit of time, the pH values were measured at various intervals to illustrate the effect of the liberated hydrochloric acid on the alkalinity. The results of this test can be found in the following table:

pH vs. time in hours on three bleach samples

| Time In Hours | (A) 1.43 gms. Ca(OCl)₂ | (B) 1.43 gms. Ca(OCl)₂ plus 0.75 gms. Na₂CO₃ | (C) 1.43 gms. Ca(OCl)₂ plus 1.18 gms. NaHCO₃ |
|---|---|---|---|
| 0 | 11.45 | 11.30 | 7.70 |
| 1 | 11.30 | 11.15 | 7.45 |
| 2 | 11.20 | 11.00 | 7.35 |
| 3 | 11.05 | 10.75 | 7.30 |
| 4 | 10.80 | 10.50 | 7.20 |
| 5 | 10.60 | 10.25 | 7.15 |
| 6 | 10.35 | 10.05 | 7.20 |
| 9 | 9.45 | 9.35 | 7.20 |
| 25 | 7.80 | 8.30 | 7.50 |

The tremendous oxidizing potential of sample C is made apparent by the initial low pH in which case the sodium hydroxide is converted to sodium bicarbonate. The strength of this sample approaches that of free chlorine. Samples A and B with their high initial caustic alkalinity lose much of their bleaching strength. Samples B and C, particularly C, must be used as soon as it is prepared, since the hypochlorous acid contained in each contains no excess alkalinity.

The use and operation of the pool treating compositions of the present invention have been described hereinabove, and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. The method of disinfecting water in a swimming pool and automatically maintaining it at a pH of between 7.4 and 7.8 when said swimming pool includes a power-driven pump, a filter, a suction line connected to said pump and pool, a first discharge line connected to said pump and filter, and a second discharge line connecting said filter to said pool, comprising the steps of:
   (a) energizing said pump to draw water from said swimming pool through said suction line and discharge the same back into said swimming pool through said first discharge line, filter and second discharge line;

(b) exposing said water as it discharges through said first discharge line to a mixture of calcium hypochlorite and a carbonate salt of sodium to permit said mixture to thereafter react in said first and second discharge lines, said filter, and in said swimming pool to form finely precipitated calcium carbonate, sodium hypochlorite, carbon dioxide and water, which sodium hypochlorite in said exposed water is in the form of hypochlorous acid and sodium hydroxide, with said sodium hydroxide in said exposed water combining with said carbon dioxide therein to form soluble sodium bicarbonate to lower the pH of said exposed water, and with said hypochlorous acid in said exposed water decomposing due to its disinfecting, oxidizing or bleaching action into oxygen and hydrochloric acid, with said hydrochloric acid in said exposed water neutralizing any sodium hydroxide remaining therein to form sodium chloride and water;

(c) recirculating said exposed water through said suction line, pump, first discharge line, filter and second discharge line to deposit said calcium carbonate precipitated in said exposed water as a layer on said filter; and (d) continuing to recirculate said exposed water to permit hydrochloric acid therein to react with said calcium carbonate on said filter to form calcium chloride, carbon dioxide and water to raise the pH of said exposed water, with said carbon dioxide reacting with said calcium carbonate and water to provide residual calcium bicarbonate in said exposed water that buffers the same against any corrosive tendency it may have on said swimming pool, pump, suction line, filter, and first and second discharge lines.

2. A method as defined in claim 1 wherein said carbonate salt is sodium bicarbonate.

3. A method as defined in claim 1 wherein said carbonate salt is sodium carbonate.

4. A method as defined in claim 1 wherein the ratio of said sodium bicarbonate to calcium hypochlorite in said mixture ranges by weight between 1.18 to 1 and 0.49 to 1.

5. A method as defined in claim 1 wherein the ratio of said sodium carbonate to calcium hypochlorite in said mixture by weight is 0.75 to 1.00.

References Cited in the file of this patent

UNITED STATES PATENTS

| | | |
|---|---|---|
| 1,339,783 | North | May 11, 1920 |
| 2,166,363 | MacMahon | July 18, 1939 |
| 2,541,799 | White | Feb. 13, 1951 |
| 2,661,333 | Schein | Dec. 1, 1953 |